United States Patent
Kapler et al.

(10) Patent No.: US 7,688,322 B2
(45) Date of Patent: Mar. 30, 2010

(54) SYSTEM AND METHOD FOR DATA VISUALIZATION USING A SYNCHRONOUS DISPLAY OF SEQUENTIAL TIME DATA AND ON-MAP PLANNING

(75) Inventors: Thomas Kapler, Toronto (CA); Eric Hall, Toronto (CA)

(73) Assignee: Oculus Info Inc., Toronto (CA)

( * ) Notice: Subject to any disclaimer, the term of this patent is extended or adjusted under 35 U.S.C. 154(b) by 161 days.

(21) Appl. No.: 11/333,325

(22) Filed: Jan. 18, 2006

(65) Prior Publication Data
US 2006/0238538 A1  Oct. 26, 2006

Related U.S. Application Data

(60) Provisional application No. 60/644,032, filed on Jan. 18, 2005.

(51) Int. Cl.
*G06T 11/20* (2006.01)
(52) U.S. Cl. .................. 345/440; 345/419; 715/700
(58) Field of Classification Search ........... 345/440, 345/419; 715/700
See application file for complete search history.

(56) References Cited

U.S. PATENT DOCUMENTS

| | | | | |
|---|---|---|---|---|
| 5,537,524 | A * | 7/1996 | Aprile | 345/440 |
| 5,664,084 | A * | 9/1997 | Smith | 345/440 |
| 5,745,110 | A * | 4/1998 | Ertemalp | 345/440 |
| 6,057,839 | A * | 5/2000 | Advani et al. | 345/440 |
| 6,466,211 | B1 * | 10/2002 | Havre et al. | 345/440 |
| 6,750,864 | B1 * | 6/2004 | Anwar | 345/440 |
| 6,985,837 | B2 * | 1/2006 | Moon et al. | 345/419 |
| 7,079,142 | B2 * | 7/2006 | Chiu et al. | 345/440 |
| 7,168,045 | B2 * | 1/2007 | Fliess et al. | 345/440 |
| 7,180,516 | B2 * | 2/2007 | Kapler et al. | 345/440 |
| 2004/0119713 | A1 * | 6/2004 | Meyringer | 345/440 |
| 2005/0012743 | A1 * | 1/2005 | Kapler et al. | 345/419 |
| 2006/0146048 | A1 * | 7/2006 | Wright et al. | 345/419 |

OTHER PUBLICATIONS

Celestine Ntuen et al., "Decision Support Display Modeling for Digital Battlefield", p. 1-5.*

* cited by examiner

*Primary Examiner*—M Good Johnson
(74) *Attorney, Agent, or Firm*—Oculus Info Inc.; Grant Tisdall

(57) ABSTRACT

A system and method is provided for coordinating display of synchronized spatial information and time-variant information on a visual interface as a visual representation of a multi-dimensional planned process. The system and method comprise a data store configured for storing the time-variant information, such that the data store is further configured for storing the spatial information as a plurality of data elements for representing visual elements for display in the visual representation with respect to a reference surface. Each of the visual elements is operatively coupled to at least one sequenced element of a plurality of sequenced elements. The system and method also include a synchronization module coupled to the data store and is configured for synchronizing a displayed state on the visual interface of the spatial information with a displayed state on the visual interface of the time-variant information. The time-variant information includes timeline data including at least two of the plurality of sequenced elements having overlapping time spans with respect to a common temporal reference frame, and includes a marker for facilitating navigation of the plurality of sequenced elements with respect to the common temporal reference frame. Changes in the displayed state of the time-variant information are reflected in changes to the displayed state of the spatial information.

31 Claims, 11 Drawing Sheets

| Fire 1 | |
|---|---|
| ⊟ Task Properties | |
| Label | Fire 1 |
| Task Type | Fire ▼ |
| Status | Planned ▼ |
| Comment | |
| Resource | -799d34a4:108c55b140b:-7fd3 |
| Time Start | 21101528RDec04 |
| Time End | 21102128RDec04 |
| Time Comment | |
| Location | 38SMB 40361 91540 |
| Latitude | 33.36143 |
| Longitude | 44.35895 |
| Children | |

Figure 8

SYSTEM AND METHOD FOR DATA VISUALIZATION USING A SYNCHRONOUS DISPLAY OF SEQUENTIAL TIME DATA AND ON-MAP PLANNING (The present application claims the benefit of U.S. Provisional Application No. 60/644,032 filed Jan. 18, 2005, herein incorporated by reference.)

The present invention relates to the synchronized visualization of temporal and spatial data in the context of a managed process.

BACKGROUND OF THE INVENTION

Planning military maneuvers is a highly complex task, involving many variables across time, geography, personnel and equipment. These maneuvers are highly dependant on situational outcomes, and must be adaptable to account for unforeseen circumstances. Simply showing time sequences of events using existing charting techniques may not be appropriate for such a multi-dimensional planned process. It can be difficult for users of the chart to understand the context in which events occur, and base future actions upon these events.

One existing technique is the use of a Gantt chart. A Gantt chart is a linear time series chart that aims to show the timing of tasks or activities as they occur over time. Although standard Gantt charts do not indicate the relationships between activities, they can be extended up on such that both timing and interdependencies between tasks can be identified. Standard Gantt charts use a fixed scale for plotting events, meaning that a particular event in a long-term plan can potentially occupy a small percentage of the chart. This makes displaying detailed information problematic. Interactive, computer-based Gantt charts can employ non-linear adjustable time scales (such as fisheye views) to allow focusing on individual elements within the chart.

One disadvantage with the use of time sequential charts, such as the Gantt chart, is that the charts are abstracted away from the context in which the tasks are done. Tasks are not viewed with the resources who are performing the tasks together with the resources' characteristics. Planners need to change their views of the charts and look at a different displays of those properties. These views are not coordinated with respect to temporal and spatial concerns and therefore planners need to remember complex properties as they move back and forth from one display type to another. For example, sequential tasks are listed in an order in the Gantt charts, but the tasks are not listed in a synchronization order or in order of geo-located or time-located.

Another disadvantage of the use of time sequential charts is that they are static and do not portray dynamic properties such as speed, rate, duration of individual resources performing the task. Nor do they portray relative dynamics such as relative speeds, rates and durations of multiple coordinated units.

Another existing technique for time sequence visualization is elaborate time-by-activity sheets used in staging and coordinating theatrical productions in order to synch lights, sound, voices, actions, and scenery. These time-by-activity sheets can be used for practical schedules, but are not suited to visualization of spatial aspects related to the sheets contents, since they fail to provide a high-level representation of task planning.

In project management, managers require a full-featured tool for planning and scheduling a project, such that the schedule includes numerous tasks, the assignment of multiple resources to these tasks, and the connection of schedules for different projects. In traditional project management, a Gantt chart (or other time sequential charts) can show when the project terminal elements (i.e. the smallest task tracked as part of the project effort) start and finish, summarize elements of the terminal elements, and display terminal element dependencies. Since the initial introduction of Gantt charts, they have become an industry standard as a key project management tool for representing the phases, tasks and activities that are scheduled as part of a project work breakdown structure or timeline of activities. Further, other methods exist to represent the tasks within a project such as a network diagram, however, such a diagram is used more to show the relationship between tasks and less on the temporal aspects of the project.

SUMMARY OF THE INVENTION

It is an object of the present invention to provide a display system to obviate or mitigate at least some of the above-presented disadvantages.

One disadvantage with the use of time sequential charts, such as the Gantt chart, is that the charts can become visually cumbersome when number of tasks becomes large and therefore the charts are best suited for planning basic tasks in a schedule in the early stages of a project. Another disadvantage with time sequential charts is that computer screens can be too small for an overview of large projects, such that horizontal and vertical scrolling through the chart contents are necessary to visualize only a small portion of the chart at any one time. Contrary to current systems and methods for project management, a system and method is provided for coordinating display of synchronized spatial information and time-variant information on a visual interface as a visual representation of a multi-dimensional planned process. The system and method comprise a data store configured for storing the time-variant information, such that the data store is further configured for storing the spatial information as a plurality of data elements for representing visual elements for display in the visual representation with respect to a reference surface. Each of the visual elements is operatively coupled to at least one sequenced element of a plurality of sequenced elements. The system and method also include a synchronization module coupled to the data store and is configured for synchronizing a displayed state on the visual interface of the spatial information with a displayed state on the visual interface of the time-variant information. The time-variant information includes timeline data including at least two of the plurality of sequenced elements having overlapping time spans with respect to a common temporal reference frame, and includes a marker for facilitating navigation of the plurality of sequenced elements with respect to the common temporal reference frame. Changes in the displayed state of the time-variant information are reflected in changes to the displayed state of the spatial information.

One aspect is a system for coordinating display of synchronized spatial information and time-variant information on a visual interface as a visual representation of a multi-dimensional planned process, the system comprising: a data store configured for storing the time-variant information, the data store further configured for storing the spatial information as a plurality of data elements for representing visual elements for display in the visual representation with respect to a reference surface, each of the visual elements operatively coupled to at least one sequenced element of a plurality of sequenced elements; and a synchronization module coupled to the data store and configured for synchronizing a displayed state on the visual interface of the spatial information with a displayed state on the visual interface of the time-variant information, the time-variant information including timeline data including at least two of the plurality of sequenced elements having overlapping time spans with respect to a common temporal reference frame and including a marker for facilitating navigation of the plurality of sequenced elements with respect to the common temporal reference frame; wherein changes in the displayed state of the time-variant information are reflected in changes to the displayed state of the spatial information.

A further aspect is a method for coordinating display of synchronized spatial information and time-variant information on a visual interface as a visual representation of a multi-dimensional planned process, the method comprising the steps of: accessing the time-variant information from a data store including timeline data including at least two of the plurality of sequenced elements having overlapping time spans with respect to a common temporal reference frame and including a marker for facilitating navigation of the plurality of sequenced elements with respect to the common temporal reference frame; accessing the spatial information from a data store including a plurality of data elements for representing visual elements for display in the visual representation with respect to a reference surface, each of the visual elements operatively coupled to at least one sequenced element of a plurality of sequenced elements; and synchronizing through use of the marker a displayed state on the visual interface of the spatial information with a displayed state on the visual interface of the time-variant information; wherein changes in the displayed state of the time-variant information are reflected in changes to the displayed state of the spatial information.

BRIEF DESCRIPTION OF THE DRAWINGS

A better understanding of these and other embodiments of the present invention can be obtained with reference to the following drawings and detailed description of the embodiments, by way of example only, in which:

FIG. 8 shows an example of chart data of FIG. 1;

DETAILED DESCRIPTION OF EMBODIMENTS

System 100

Figure 1:
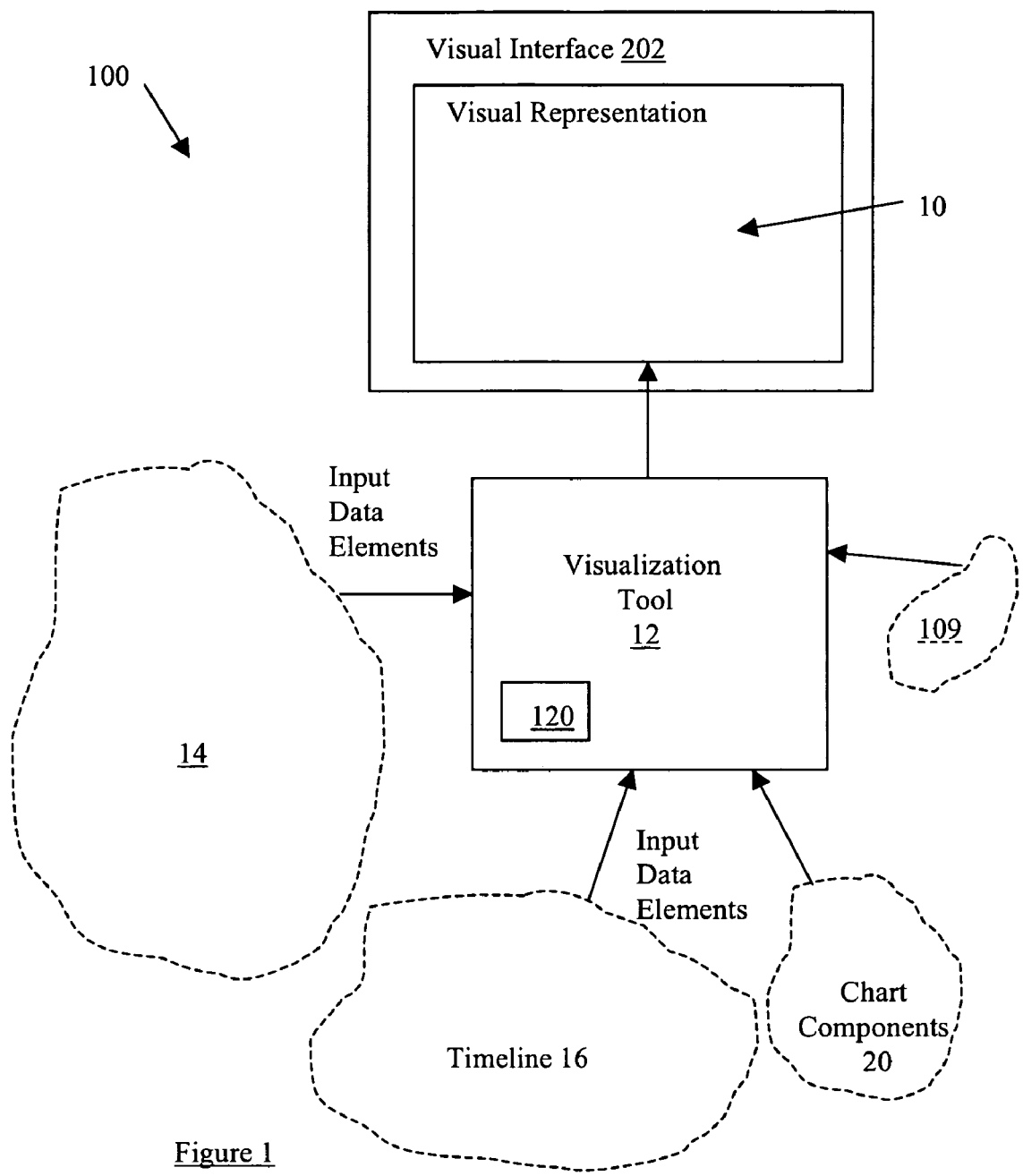
FIG. 1 is a block diagram of a visualization data processing system.

Referring to FIG. 1, a visualization data processing system 100 includes a visualization tool 12 for processing a collection of data objects or entities/elements 14 as input data elements (e.g. geographic- or map-based) for display in a visualization representation 10 presented on a visual interface 202. The visualization data processing system 100 provides a means of linking a high-level temporal chart information with a visual display of tasks, actors and interactions, such that focus can be achieved while maintaining overall context. The visualization data processing system 100 facilitates an interactive, collaborative, and real-time visualization of various managed scenarios or scripted processes (e.g. battlefield operations) that involve interconnected spatial and temporal information typical in a multi-dimensional planned process. For example, the data objects 14 can represent multiple events, resources and actors, which are combined by the tool 12 with synchronized timeline data 16 and supplemental chart data 20 to generate a synchronous interactive (e.g. animated) visual representation 10 on the visual interface 202. The animation of the data objects 14 in the visualization representation 10 with the animation of the timeline data 16, while navigating, can be used in both planning and playback of the managed scenario. For example, the timeline data 16 is displayed synchronously with the visualization representation 10 and can represent a plurality of overlapping time periods (sequenced elements 17) related to a variety of different data objects 14. The chart data 20 can represent detailed parameter definition(s) of data objects 14 and their interdependencies. It is recognized that the data objects 14 and chart data 20 are synchronized with one another through the timeline data 16 for coordinated display in the visualization representation 10, where changes in visual elements representing the data objects 14 and chart data 20 can be animated in the visualization representation 10 as desired. As described above, the tool 12 is used to coordinate on-map (i.e. the visualization representation 10) animation and planning, including zero hour relative task starts for a generic sometime in the future plan.

Management of the synchronized data objects 14 and the data 16,20 can be driven by user events 109 of a user (not shown) via a user interface 108 (see FIG. 2), during user interaction with the visual representation 10. It is recognized that management (including display characteristics of the timeline data 16 and the visualization representation 10 as well as corresponding data definitions) of the data objects 14 and data 16,20 can be facilitated through automation (or semi-automation) using predefined operating rules (e.g. stored in memory and/or a computer readable medium 46—see FIG. 2) of the tool 12, as desired. The timeline data 16 and the associated chart data 20 are provided to the tool 12 through use of sequencing charts (e.g. Gantt-like—see FIG. 4)), thus facilitating the generation of the interactive 3D visualization representations with tiered contexts for viewing plans, further described below.

Figure 2:
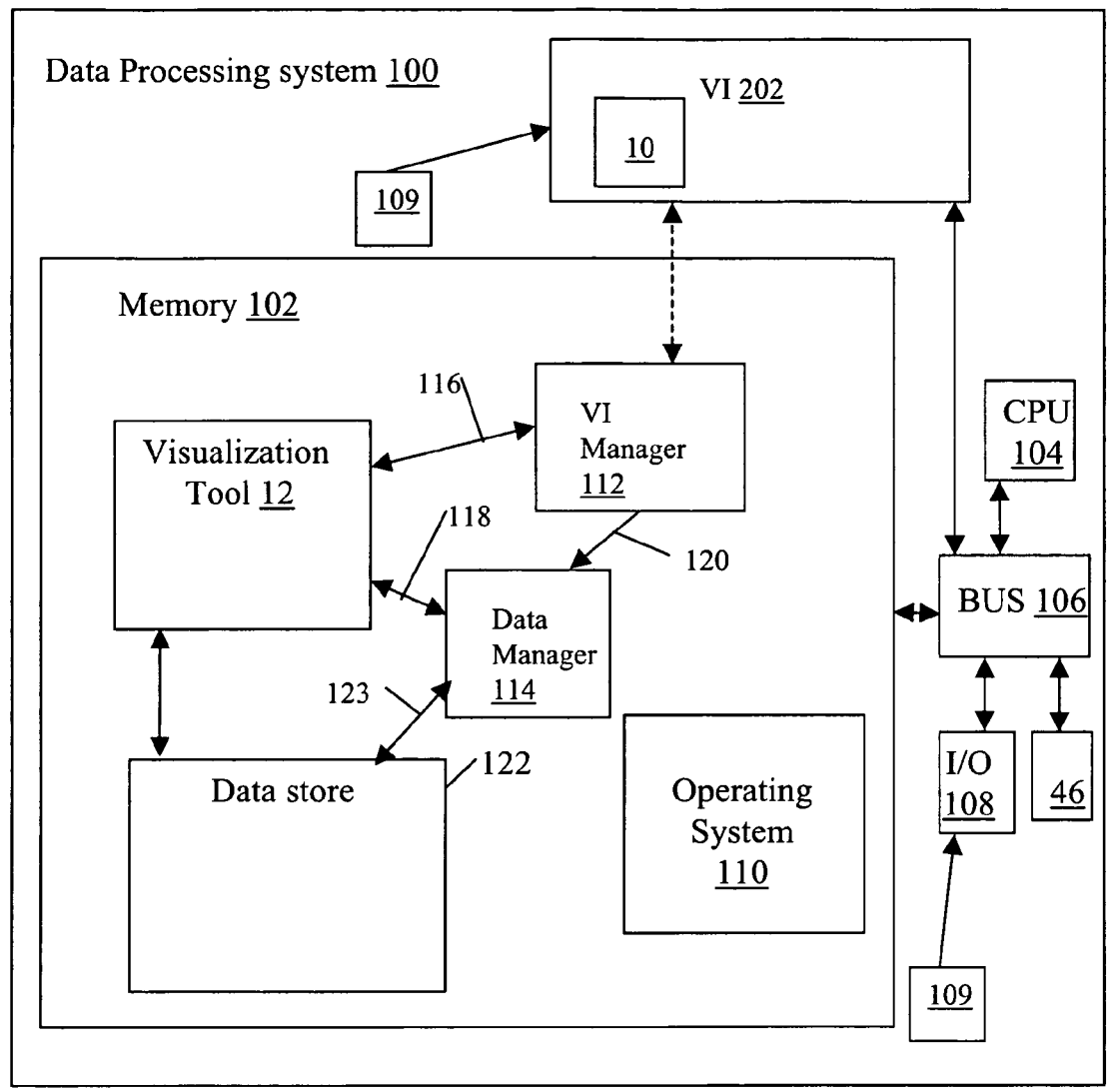
FIG. 2 shows further details of the data processing system of the system of FIG. 1.

Referring to FIG. 2, the data processing system 100 has the user interface 108 for interacting with the tool 12, the user interface 108 being connected to the memory 102 via a BUS 106. The interface 108 is coupled to a processor 104 via the BUS 106, to interact with the user events 109 (as well as programmed events—not shown) to monitor or otherwise instruct the operation of the tool 12 via an operating system 110. The user interface 108 can include one or more user input devices such as but not limited to a QWERTY keyboard, a keypad, a track wheel, a stylus, a mouse, and a microphone. The visual interface 202 is considered the user output device, such as but not limited to a computer screen display. If the screen is touch sensitive, then the display can also be used as the user input device as controlled by the processor 104. Further, it is recognized that the data processing system 100 can include the computer readable storage medium 46 coupled to the processor 104 for providing operating instructions to the processor 104 and/or the tool 12. The computer readable medium 46 can include hardware and/or software such as, by way of example only, magnetic disks, magnetic tape, optically readable medium such as CD/DVD ROMS, and memory cards in each case, the computer readable medium 46 may take the form of a small disk, floppy diskette, cassette, hard disk drive, solid-state memory card, or RAM provided in the memory 102. It should be noted that the above listed example computer readable mediums 46 can be used either alone or in combination.

Referring again to FIG. 2, the tool 12 interacts via link 116 with a VI manager 112 (also known as a visualization renderer) of the system 100 for presenting the visual representation 10 on the visual interface 202, along with visual elements representing the synchronized data objects 14, timeline data 16 and chart data 20. The tool 12 also interacts via link 118 with a data manager 114 of the system 100 to coordinate management of the data objects 14 and data 16,20 resident in the memory 102. The data manager 114 can receive requests for storing, retrieving, amending, or creating the objects 14 and the data 16,20 via the tool 12 and/or directly via link 120 from the VI manager 112, as driven by the user events 109 and/or predefined operation of the tool 12. The data objects 14 and the data 16,20 can be stored in a data store 122 accessible by the tool 12 and data manager 114. Accordingly, the tool 12 and managers 112, 114 coordinate the processing of data objects 14, data 16,20 and associated user events 109 with respect to the graphic content displayed on the visual interface 202.

Visualization Representation 10

Figure 3:
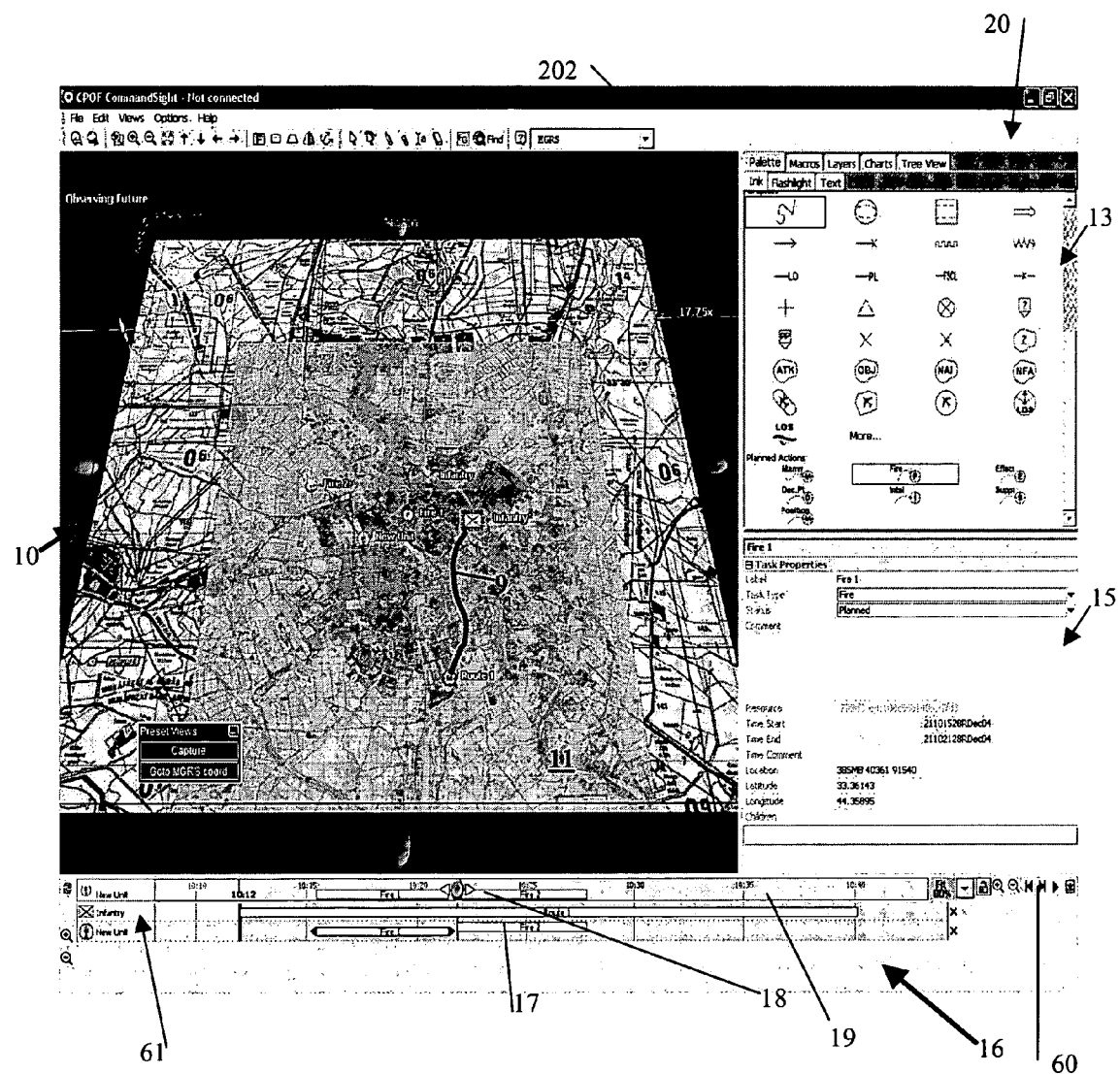
FIG. 3 shows an example display of a visual interface of the data processing system of FIG. 2.

Referring to FIG. 3, user planning and interaction with the tool 12 is facilitated through two main components, namely the timeline data 16 and the visualization representation 10 (e.g. a 2D or 3D battlefield), such that navigation thought the timeline data 16 is synchronized with changes in the display of visual elements representing the data objects 14 and chart data 20 in the visualization representation 10. Navigation of the timeline data 12 is facilitated, for example, through use of a time marker 18 (e.g. a slider control) moved in the context of a common temporal reference frame 19. The timeline data 16 includes a plurality of sequenced elements 17 (e.g. tasks, process step, actions, events, resources, or other time variant processes) overlapping in time as represented by the temporal reference frame 19, as further described below. Interdependencies between the sequenced elements 17 can be defined in the chart data 20, for example. The chart data 20 can include components such as but not limited to various icons 13 for use in representing the data objects 14 and descriptions/definitions 15 of the various data objects 14. The data objects 14 can include terrain 11 or other spatial data 11 (e.g. a process flow chart). The data objects 14 can also be used to represent routes/paths 9 shown on the terrain 11 and/or in the air above the terrain 11, as desired.

Figure 11:
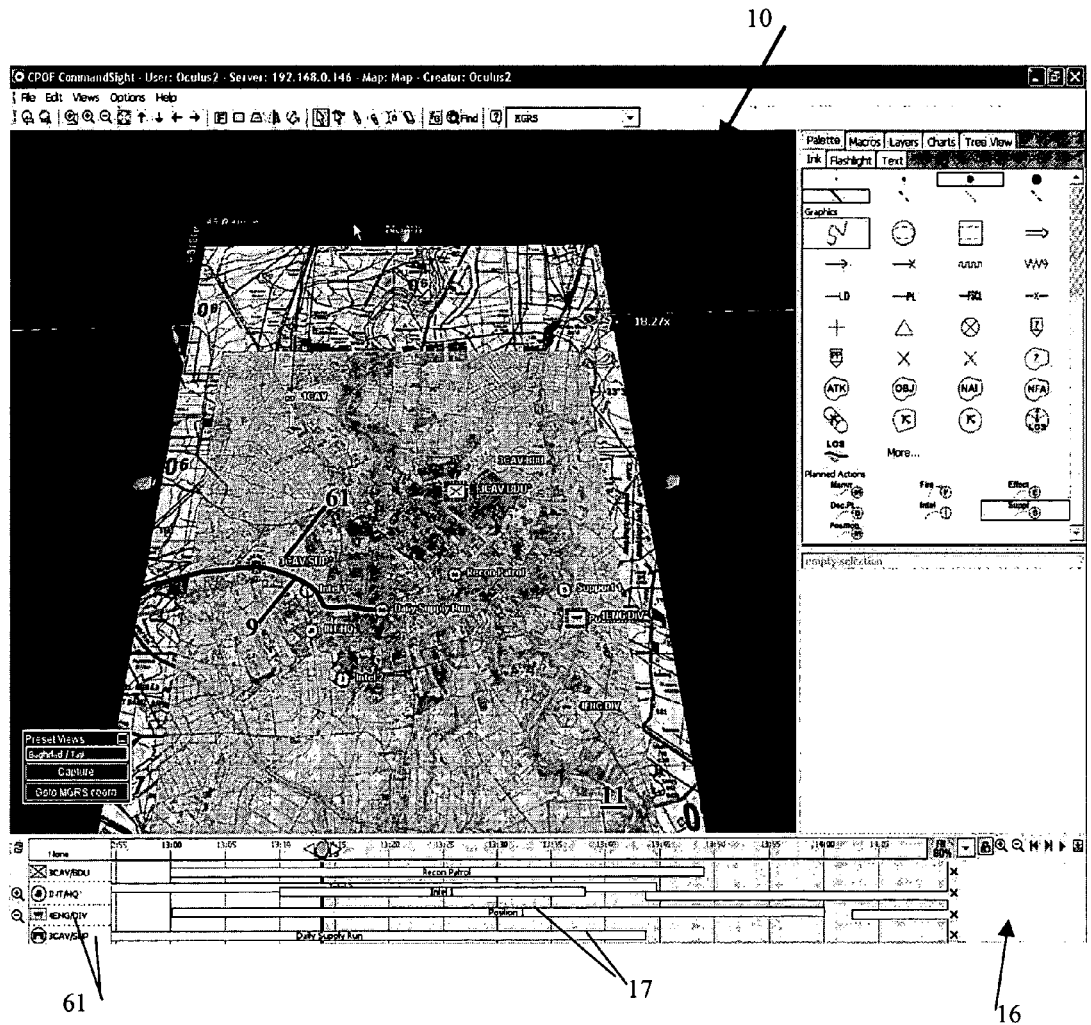
FIG. 11 is a further embodiment of the visual interface of FIG. 3.

Referring to FIG. 11, synchronization of multiple units 61 with respective tasks 17 is shown in the timeline data 16 and on the terrain 11 of the visualization representation 10.

The combination of the timeline data 16 synchronized with portrayal of the data objects 14 and the chart data 20 facilitates 3D representation (or 2D if desired) of a managed scenario in the visualization representation, such as but not limited to a manufacturing process, a theatrical production, a battlefield and the plans executed within, an engineering project, etc . . . The display of the managed scenario (e.g. visualization representation 10) is directly linked to the chart data 20 and data objects 14 as they in turn are synchronized in the temporal reference frame 19 via their assigned sequenced elements 17. It is recognized that interaction by the user with the visualization representation 10 through the user interface 108 directly affects the timeline data 16 representation, and vice-versa.

For example, the significance of the synchronization of the visualization representation 10 and timeline data 12 contents is that it facilitates users of the tool 12 to plan battles in a manner similar to pushing models around a physical map, while retaining the temporal aspect of outlining a battle from a project planning standpoint through use of the chart data 20. The tool 12 can be used to organize the highest level of plan abstraction of a selected managed scenario through Gantt chart like information (organized through the chart data 20 and timeline data 16) depicting the entire plan. These plans can be coordinated to a minute-by-minute resolution level, as is done in battle simulation. Operations described via the data objects 14 and data 16,20 may be anywhere from a few minutes up to several months, for example. When viewing a long-term plan on the visual interface 202, a high level view can be somewhat useful for tracking a coarse-grain overview of the battle. Further, the data 16,20 can be manipulated according to a variable scale of the temporal reference frame 19 for plotting events and other data objects 14, such that a selected event/data object 14 (or series events/data is objects 14) in a long-term plan may occupy the entire displayed timeline data 16 and visualization representation 10. This selected display via the variable scale of the temporal reference frame 19 facilitates drilling down for detailed information of the plan by the user of the tool 12. The tool 12 can also be used to fit selected tasks (e.g. in the timeline data 16) in the displayed visualization representation 10, via selecting a "Fit to zoom" control. Accordingly, the tool will either fit the selected tasks in the visualization representation 10, of if the user does not select any tasks then the tool 12 will fit all plan tasks. The "Fit to zoom" control can make it easier for the user to find all the tasks when planning across a large time span.

Chart 20 and Timeline 16 Data

Figure 4:
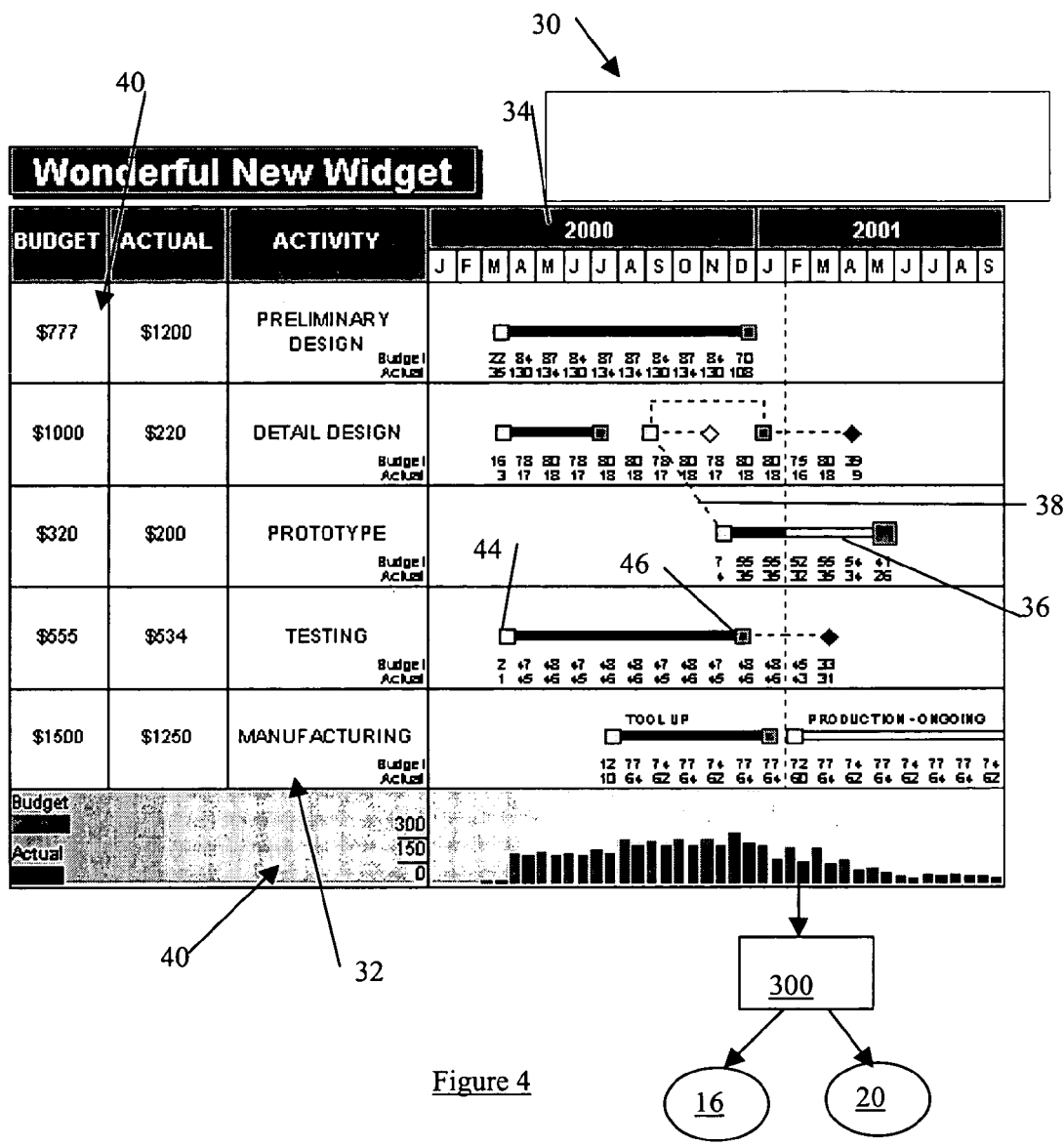
FIG. 4 shows content details in a Gantt type chart of graphics data for display on the visual interface of FIG. 2.

Referring to FIGS. 2 and 4, a typical Gantt chart 30 is shown to portray in context the timeline data 16 and chart data 20 that can be extracted, formatted, and then used as input to the tool 12 for generation of the timeline data 16 and visualization representation 10. It is recognized that the timeline data 16 and the chart data 20, when in the form of a Gantt chart 30, can be converted by the tool 12 through use of a conversion module 300 and stored in the data store 122 in the required format. The stored data 16,20 would be for subsequent use in planning and display on the visual interface 202 as the data 16, 20 synchronized with the corresponding visualization representation 10. It is recognized that additional data objects 14 may need to be added to the data obtained from the Gantt chart 30 to facilitate the synchronous display of the data 16,20 with the visualization representation 10. For example, terrain images and icons for representation of entities that implement the associated tasks represented in the data 16,20 can be added to the data store 122 by user events 109 through use of the tool 12, as further described below. The tool 12 can be configured for scenario planning using representational units as the data objects 14 (user created on the terrain 11), or by using real units as the data objects 14 reported through a data feed (not shown) coupled to the tool 12.

The timeline data 16 can be used to show both the sequenced elements 17 and their associated units 61, displayed together.

Referring again to FIG. 4, the tool 12 can be configured to obtain the data 16,20 from the Gantt chart 30, which in its most basic form is a bar chart used in planning and tracking by plotting the tasks/resources 32 of the project versus time 34, thus depicting project progress in relation to time. The tasks are displayed as bars 36 on the timescale 34. The timescale 34 is a scale of major and minor time units that extends from the date the project begins to the date it ends. The time units for the timescale 34, its start and end dates, and the days that considered nonworking days can be defined in this manner.

The chart 30 can also have vertical linkages 38 showing how the elements are sequentially inter-linked, over several tasks/resources 32 simultaneously. For example, the chart 30 can use graphical elements, such as bars and arrows, to represent tasks 32 and the dependencies 38 between them, and track how changes in one task 32 affect the others. The chart 30 can also be used to group several subordinate tasks 32 under one summary task and add useful data 40 such as descriptions, required resources, and completion percentages to each task. The chart 30, has dates for the timescale 34, such that the number of tasks 32 associated with particular dates have duration that indicate how long tasks 32 will take. Further, the chart 30 can have a start date 44 on which the project (or specific task(s)) begins, a finish date 46 on which the project (or specific task(s)) ends. The chart 30 also indicates major units of time, such as years or months, that is used in the timescale 34. The chart 30 also indicates minor units as the smallest unit, such as days or hours, that is used in the timescale 34. Further, the chart 30 can have additional data about each task placed in specified columns 40. For example, you can add a resource column so the chart 30 reflects who is responsible for each task.

Referring again to FIG. 4, it is noted by example that each task 32 occupies a row in the chart 30 frame, milestones (not shown) can be included that represent a significant event in a schedule rather than the task with the milestones duration set to zero. Summary tasks 32 are included when you want to combine several subordinate tasks 32 under one umbrella task 32, dependencies 38 (linked tasks) are included when one task 32 is made dependent upon another by an arrow connecting the two task bars 36. The chart 30 can also include data columns 40 to indicate how the project schedule is built from task-specific data. The data columns 40 can also be used to describe complex or unique tasks, resources to list the people responsible for completing each task 32, and percent complete to track what percentage of each task has been completed.

Timeline Data 16 Representation

Figure 5A:
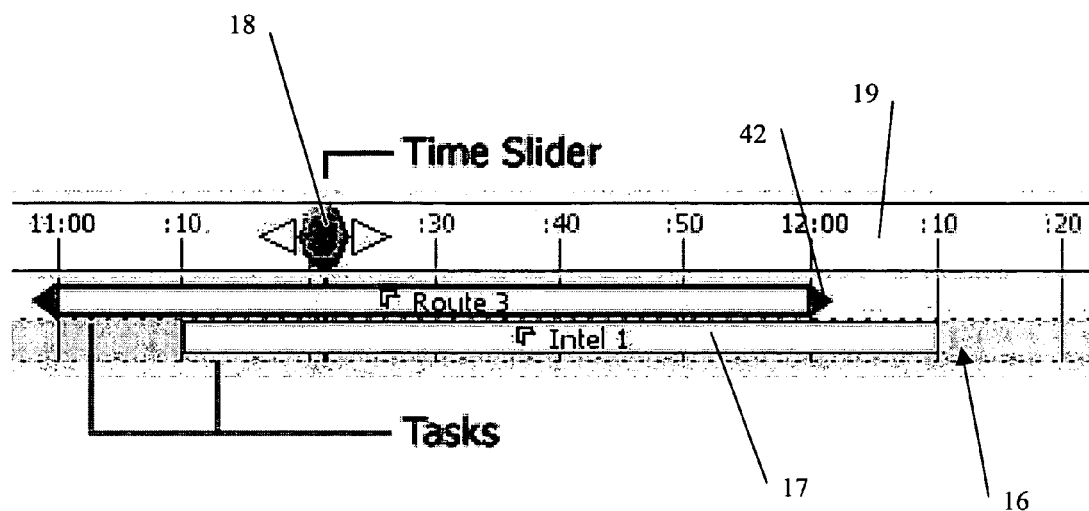
FIG. 5a is an example embodiment of control of the timeline data of FIG. 3.

Referring to FIGS. 3 and 5a, the tool 12 couples, through a synchronization module 302 (see FIG. 7), the chart data 20 and timeline data 16 with interactive 3D visualization representations 10 to provide tiered contexts for viewing managed scenarios such as battle plans. The tool 12 employs a variable time scale on the temporal reference frame 19, allowing users to zoom out to view an entire list of sequenced elements 17 displayed with the timeline data 16, or zoom in on a particular section/portion of the temporal reference frame 19 to view the corresponding sequenced elements 17 included in that portion at an increased level of detail. For example, when zooming in, the timeline data 16 and corresponding chart data 20 occupy a proportionate amount of space on the visual interface 202, thus providing for the display of a higher degree of information. The higher degree of information can include displayed information such as but not limited to: a summary task is displayed as its respective subordinate tasks, additional descriptions are displayed in the chart data 20; dependencies 38 (see FIG. 4) are displayed in the timeline data 12; etc . . . It is recognized that the rows of the timeline data 16 can be resized via user events 109 in order to better view overlapping tasks 17.

Referring again to FIG. 5a, the sequenced elements 17 (e.g. tasks) appear on the timeline data 16 overlapping in time as labeled rectangles, for example, and occupy space proportionate to their duration in the temporal reference frame 19. These rectangles can be moved left and right through user events 109 to adjust the sequenced elements' 17 start time, or stretched from the left and right edges 42 to adjust their duration. The user through user events 109 can group plan tasks 17 in an effort or task group (not shown) in the timeline data 16, by dragging and viewing efforts in the timeline data 16, in order to group tasks and units for multi-phase operations. The groups can be marked and toggled on/off in the visualization interface 10, as desired. The task group can be displayed in the timeline data 16 to help the user more easily view the plan duration (from earliest task start time to latest task end time). Further, users can drag the task group with respect to the reference frame 19 to adjust the start time for all tasks 17 at once. Further, all tasks in an effort can be shifted by right clicking on the effort in the layers panel 50.

Figure 5B:
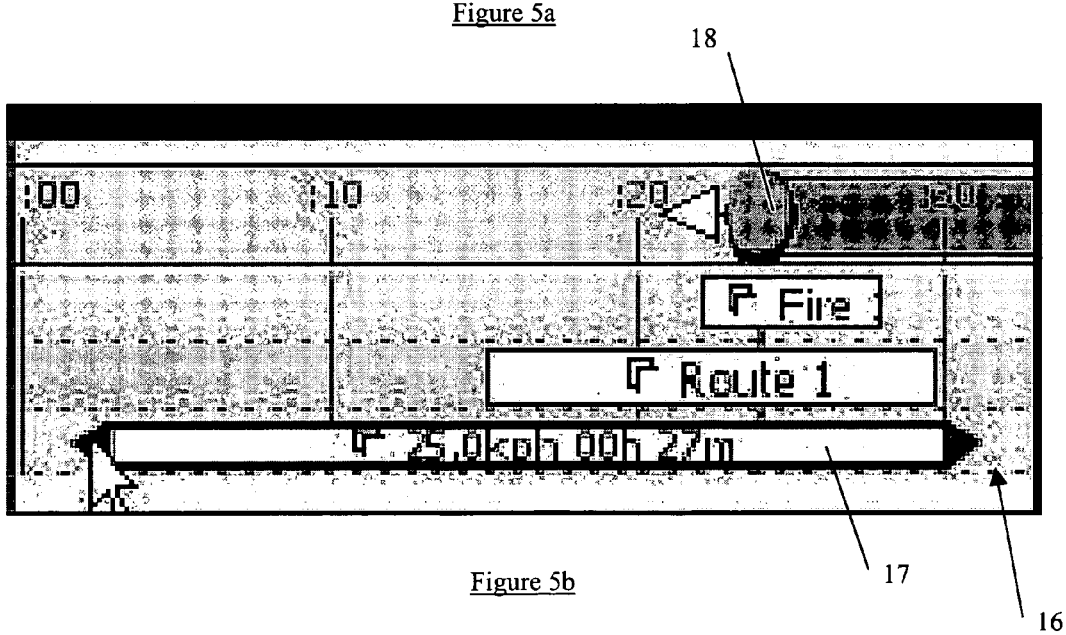
FIG. 5b is a further example embodiment of control of the timeline data of FIG. 3.

Referring to FIG. 5b, mousing over the task 17 shows that the initial plan had Unit 2 traveling at 47 kph. We can drag the start time of the maneuver back in time until the calculated speed reads 25.0 kph. The maneuver now has a duration of 27 minutes instead of 14. As the start time of Route 2 is dragged, Unit 2's location is continuously updated on the display of the visualization representation 10. To move a phase or group of tasks 17 in time at once, shift-click on each in the timeline data 16 to select all of them, then drag them forward. If all the tasks 17 are grouped in an effort, right-click on the effort symbol in the Effort panel 50 and choose "Select All" to Show/hide the schedule. Remove this unit from the schedule.

The real-world time, as depicted by the state of the data objects 14 in the visualization representation 10, is indicated on the temporal reference frame 19 with a marker 18 that can be moved across the temporal reference frame 19 to show the progress of time, which is synchronized with the displayed state of the data objects 14 (preferably animated) as the marker 18 is scrolled from side to side. For example, the sequenced elements 17 shown to the left of the marker 18 occurred in the past, while sequenced elements 17 to the right have yet to occur. Users of the tool 12 can drag the marker 18 along the temporal reference frame 19 to view the sequenced elements 17 that occurred in the past or that have yet to occur. Doing so updates the animations of the data objects 14, associated with the sequenced elements 17, in the 3D visualization representation 10.

Figure 6:
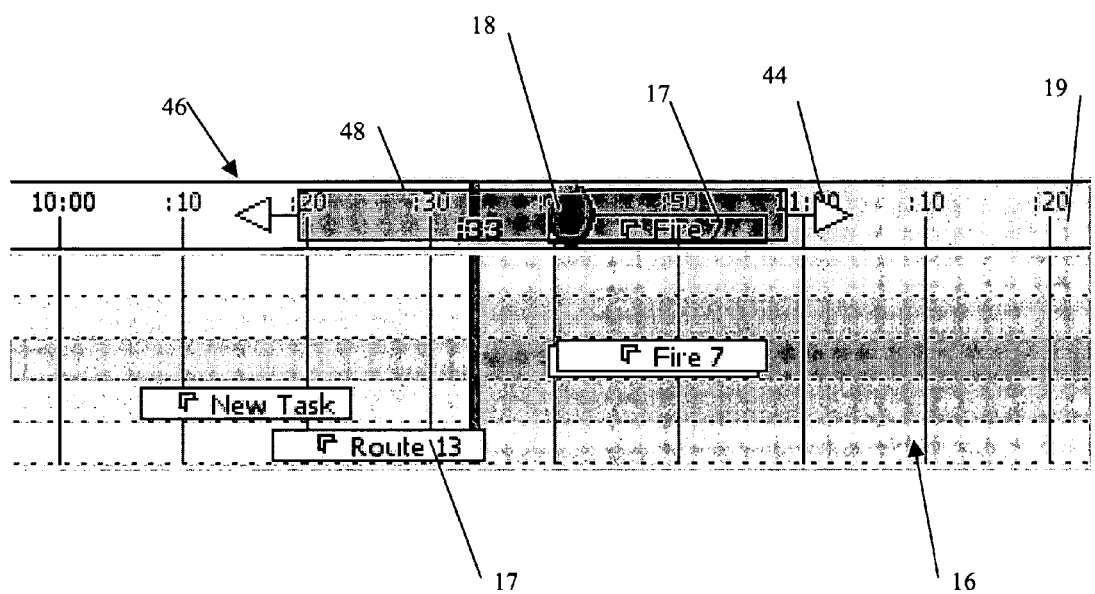
FIG. 6 shows a further embodiment of the timeline data of FIG. 5.
Figure 7:
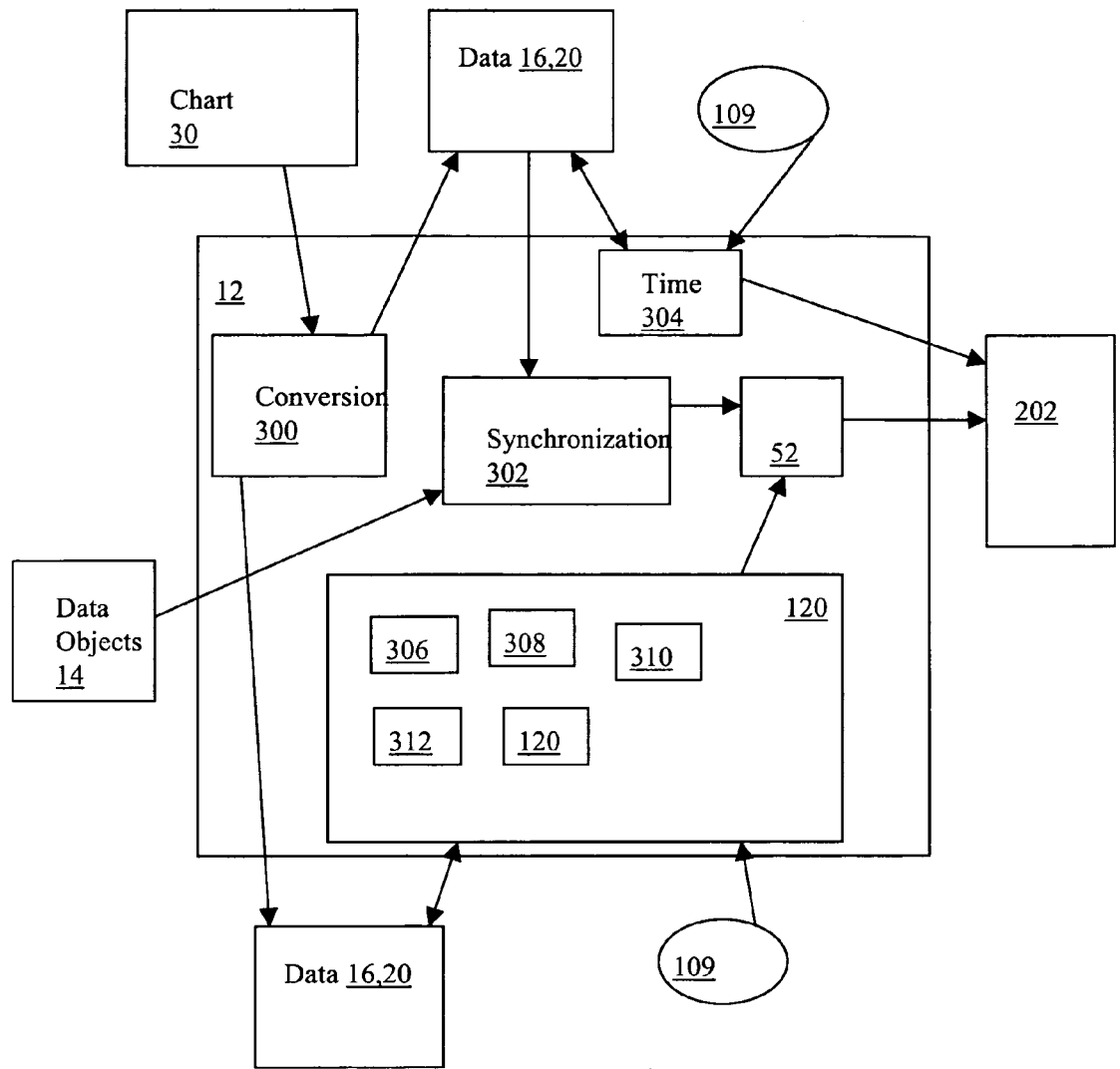
FIG. 7 shows further details of the tool of FIG. 1.

Referring to FIGS. 5 and 6, adjustment of the sequenced elements 17 timing and duration on the temporal reference frame 19 is performed by a timeline module 304 (see FIG. 7). For example, when associating a battlefield unit (e.g. data object 14) with a task (e.g. sequenced element 17), the battlefield unit will appear as a new label entry in the timeline data 16 displayed on the visual interface 202 (e.g. a new rectangle appears with the name of the corresponding battlefield unit). The current task, as well as any future tasks applied to the battlefield unit, occupies a respective time span with respect to the temporal reference frame 19. The default time span for the task can be set by stretching an arrow 44 at the end on the right side of the time marker 18. This enables multiple tasks to simultaneously be set to occupy the same time span, thereby helping to simplify the rapid synchronization of tasks. Further, r-click options (e.g. user events 109) on the time marker 18 and temporal reference frame 19 can be used to position the marker 18, as desired. For example, fitting a task on the timeline data 16 by r-clicking on it on the terrain 11 and r-click options on the timeline data 16 make it easier to manipulate the time slider/marker 18.

To help avoid confusion when layout out and animating multiple battlefield units and their associated tasks, the timeline module 304 can adjust the display of a time slider portion/bar 46 of the timeline data 16 in respect to user events 109. For example, when a battlefield unit has been selected on the terrain 11 (see FIG. 1), moving the time marker 18 causes the battlefield unit's tasks (i.e. sequenced elements 17) to become superimposed over the time slider bar 46 and the actual task line becomes highlighted. Further, when animating the visual element representing the data objects 14 (coupled to selected sequenced element(s) 17), the visual element can be outlined in the visualization representation 10 to more easily identify the visual element in the scene (e.g. on the terrain 11). Further, a bounding box 48 can be displayed to help indicate all sequenced elements 17 associated with the selected battlefield unit(s), such that the box 48 contains the associated sequenced elements 17. This association can free the user from having to sort through several lines of tasks to find the one that is relevant to the battlefield unit. It should be noted that context of all sequenced elements 17 in the displayed timeline data 16 can be maintained, as the sequenced element 17 displayed in the box 48 is still displayed with all other overlapping sequenced elements 17, as shown by example with the "fire 7" task of FIG. 6.

Further, time spans of the respective sequenced elements 17 can be stretched and slid along the timeline to occupy a set time region through manipulation of the ends 42. Multiple sequenced elements 17 can be selected in the timeline data 16 and updated simultaneously by the module 304, thus helping to reduce alignment errors. Timing can also be precisely adjusted by modifying values 48 in an element's properties pane 50 (see FIG. 8), as displayed on the VI 202 (see FIG. 1 as well). Further, the user of the tool 12 can set the altitude of a battlefield unit (or other data object 14) in the properties panel 50 and see the corresponding visual element of the battlefield unit displayed at the proper altitude in the visualization representation 10. For example, air corridors can be used as maneuver routes over the terrain 11, such that the respective unit will animate along the route in 3D by following the altitude. The properties panel 50 can be used to facilitate editing of task and unit properties, including such as but not limited to: label; task type; status; and time start/end. Editing of the timeline data 16 can be used to adjust time start/end, duration, and unit speed.

It is recognized that the module 304 can be used to update the display of the pane 50 and corresponding values 48, where the pane 50 can display properties for one or more sequenced elements 17. For example, the pane 50 can display only those sequenced element(s) 17 selected, the pane 50 can display the properties of all sequenced elements 17 shown in the timeline data 16 contained within the temporal reference frame 19 (shown in the bar 46), the pane 50 can display the properties of any sequenced element(s) 17 not shown in the timeline data 16 contained within the temporal reference frame 19 (shown in the bar 46), or a combination thereof. Double-clicking on the task in the timeline data 16 can also prompt the user to set the start and end times, as desired. Further, it is recognized that the display of the timeline data 16 can be simplified by selectively removing (or adding) the battlefield units from the timeline data 16 that the user is not interested in. These tasks will still execute in the visualization representation 10 as the time marker 18 is manipulated along the temporal reference frame 19, but visual cluttering of the timeline data 16 for plan adjustment can be managed.

Modules of the Tool 12

The tool 12 uses a custom 3D engine 52 (in conjunction with the VI manager 112—see FIG. 2) for rendering highly accurate models of real-world terrain 11, for example, which are texture mapped with actual map and landsat data. This provides users with a realistic environment for planning operations. Users can use the I/O 108 to pan and rotate around the terrain 11 and zoom in and out to view varying amounts of space. Accurate models of military equipment (e.g. data objects 14) can be placed on the terrain 11 surface, as well as standardized military battle symbols and terrain markings (also known as inks). These models, symbols and markings provide more than a superficial means of annotating the terrain 11; they can be interacted with like real world objects, and are used in coordination with the timeline data 16 to plan events. Moving the marker 18 to navigate a plan's chronology causes the models (represented as the data objects 14) to animate across the terrain 11 of the visualization representation 10 along prescribed paths, giving a "live" enactment of the battle. The display of the visualization representation 10 and it's contents is coordinated by the engine 52, in conjunction with the synchronization module 302. The animation may also be arbitrarily played, paused or stopped by using VCR-style controls (e.g. controls 60) linked to the marker 18.

It is also recognized that the tool 12 can be adapted for real-time use with several users on multiple systems 100, all connected via a common network (not shown). All users may view and interact with the same shared displayed visualization representation 10 and timeline data 16, where changes in the data 16 (or chart data 20 where appropriate) made by one user are propagated through to all other users and displayed. This multi-user environment allows for collaborative planning sessions to include team members in disparate regions, including using real units and their chart data 20 parameters reported through a data feed coupled to the tool 12. Further, it is recognized that the tool 12 can be used collaboratively (i.e. two or more tools 12 linked over a network—not shown) to plan a war game, such that two or more people play opposing sides and try to test the plan stored in the data store 122 as the data 16,20 and data objects 14. Further, it is recognized that tow or more networked tools 12 can be used by their respective users to collaborate on plans, such that two or more people at different locations (and/or different times) can jointly construct and edit the plan.

Referring again to FIG. 7, the tool 12 has dynamic animated sequenced element modules 120 including such as but not limited to: lay out units module 306; create tasks module 308; associate units with tasks module 310; create paths for navigable tasks module 312; and adjust task timing and duration on the timeline module 314. The modules 120 interact with the managers 112,114 via the user events 109 to coordinate persistence and display of the database 122 contents (data 16,20). The following modules 120 are described using a battlefield example, by way of example only, where it is recognized that other appropriate modules 120 could be defined or other wise adapted in the tool 12 to manage other types of managed scenarios as desired. The tool 12 can also resize rows of the timeline data 16 to facilitate viewing details of the visible sequenced elements 17.

Laying Out Units Module 306

Referring to FIG. 7, battlefield units (e.g. data objects 14) are the entities that participate in the theatre of operations, such as infantry, brigades, divisions, etc. During battle planning, battlefield units placement on the 3D terrain 10 is done by the module 306 according to where the battlefield units appear in the real world. The battlefield units are represented by icons on the visualization representation 10, determined by military symbology, but may be toggled to 3D icons by the module 306 that accurately depict their shape and other descriptive physical characteristics. Battlefield units are also colored by the module 306 in accordance to their friend/foe status. Once placed on the terrain, the battlefield units may be freely moved around or removed in conjunction with the synchronized timeline data 16.

Creating Tasks Module 308

Tasks (e.g. sequenced elements 17) are common operations that battlefield units can perform, including maneuvers, fire tasks, effects, decisive points, intelligence reconnaissance, and support. Tasks are created using the module 308 through the use of a context menu via events 109, generated by clicking on the terrain 11. The tasks can appear as a representative icon on the visualization representation 10, as well as in the timeline data 16 as desired. As with battlefield units, tasks can be freely moved about the terrain 11 during planning of the battlefield scenario.

Create Paths for Navigable Tasks Module 310

In the case of navigable maneuver task, selecting via the module 310 of an ink tool and dragging the mouse along the terrain 11 draws a path for the battlefield unit to follow, as calculated by the module 310. This defined path is associated with the task (e.g. sequenced element 17) and during the duration of the task, when animated, the battlefield unit will animate along the path in respect to its position at each moment in time, as represented in the timeline data 16. In order to associate the ink with selected task(s), the user can draw an ink route (any type) on the visualization representation 10 and then drag it to the maneuver task (e.g. sequenced element 17) in the timeline data 16. The unit coupled to the sequenced element 17 will follow the assigned route. Further, it is recognized that a replacement route can be dragged to the task and the unit will follow the assigned new route, as desired.

Further, users can use the module 310 to draw updated maneuver routes later in the planning phase, such that the battlefield unit will follow the latest one. The module 310 can also be used hide/show different routes/tasks so the user can walk through different scenarios when manipulating the marker 18. It is recognised that the timeline data 16 and visualization representation 10 contents are synchronized with one another, such that changes to one content will be reflected in the other associated content.

Associating Units with Tasks Module 312

In one embodiment, units and tasks may be associated by using the association module 312 to drag one icon (representing data objects 14) on to another, thus linking the two icons. For navigable maneuver tasks, the ink path is also dragged on to the task, defining the route for the battlefield unit to follow. These associated battlefield units and ink paths appear as children of the task in its properties pane 50 (see FIG. 8). Bach task may only have one unit associated with it, as desired. In a further embodiment, the module 312 can also be used to facilitate storing of associations done by dragging units directly to the sequenced elements 17 in the timeline data 16. For example, tasks can be dragged directly to the unit's line/row of the timeline data 16 to associate the new task with the unit. Further, users can reassign tasks to different units by dragging the selected task from one unit to another displayed in the timeline data 16.

Accordingly, the module 312 can be used to coordinate the placement of units and task by such as but not limited to: drag units directly to the timeline data 16; assign/reassign tasks to units by dragging to a unit in the timeline data 16; reassign the task by <alt> dragging from one unit on in the timeline data 16 to another unit; reassign a new route to a maneuver task by dragging it to the task in the timeline data 16; and choose a new position for a task in the timeline data 16 by dragging the task from one spot to the next with represent to the temporal reference frame 19.

Gesture Module 122

One-Click (or more) gesture specification/creation of tasks can be done through a gesture module 122, wherein planned actions are provided through a one-click method for assigning a task to a battlefield unit. This gesture specification enables the user to rapidly setup multiple tasks for planning by reducing the steps required and reducing the confusion inherent in associating several tasks and units, as well as the setup of multiple task components in one gesture (e.g. unit, type of task, route). By using the gesture module 122, simply selecting a battlefield unit icon 61 (see FIG. 9) via events 109 associates the unit with a selected sequence element(s) 17 of the timeline data 16, where for example the unit 61 can be dragged from the visualization representation onto one or more sequenced elements 17 of the timeline data 16 in order to associate the unit 61 with the sequenced element(s). If creating a maneuver task, holding down the mouse button, for example, and dragging will draw the navigable route for the battlefield unit to follow. This inked route can then be dragged onto selected sequenced element(s) 17 in the timeline data 16, in order to associate the inked route with the selected sequenced element(s) 17. The module 122 also updates the corresponding task shown in the timeline data 16 (as well as the properties of the chart data 20) with the information inherent to the changes (e.g. drawn navigable route) in the visualization representation 10. Therefore, association of task with the battlefield unit can be done while in conjunction with terrain 11 specifics as well as timeline considerations. It is recognized that expressive icons 61 can be used that indicate the nature of task/action, for example an icon of a missile in the visualization representation 10 would be indicative of a firing action listed in the timeline data 16

Synchronization Module 302

The module 302 enables plan/playback synchronization of routes and effects (e.g. sequenced elements 17) for multiple entities (e.g. data objects 14) across both time (given by timeline data 16) and space (portrayed in the visualization representation 10). For example, changes done by the user (e.g. direct interactions) while editing the sequenced elements 17 (e.g. tasks) will be implemented with immediate visual feedback of the changes via changes to visual elements in the displayed visualization representation 10. For example, changes in bar length of the sequenced elements 17, changes by movement of the bar in time, and changes in route geometry and length will result in correspondingly displayed edits of affected visual elements in the visualization representation 10. Further, it is recognized that the module 302 can be used to organize the data objects 14 and the data 16,20 into phases and alternative course of actions (COAs), such that each of the courses of action can be toggled on/off and the play back of one or more of courses of action can be done at a time. An example of the COAs is one unit associated with three different maneuver tasks at the same time, representing three route options.

Route Synchronization

Several maneuvers can be synchronized across one or many routes of the visualization representation 10. Through the use of the timeline data 16, standard interactive chart data 20 adjustments are provided. By sliding and stretching tasks to adjust start time and duration, the module 302 can synchronize multiple maneuvers for simultaneous waypoint arrival. Each battlefield unit can be given a new line/row on the timeline data 16, with the battlefield unit's associated tasks appearing along the line/row. Users can set several maneuver tasks through user events 109 to have the same end point, despite having routes of different length. The module 302 calculates the speed at which each battlefield unit would need to travel along their respective routes in order to reach the waypoint at the same time. Travel time, distance, and speed are reported to the user, by the module 302 via the VI 202, which can in turn be passed (via telecommunication) to real world battlefield units in the field to coordinate travel.

Further, multiple vehicle synchronization along a single route can be enabled by the module 302 by allowing multiple battlefield units to use the same ink path as its navigable route. Associating multiple maneuver tasks and their battlefield units with the same ink on the visualization representation 10 helps for common maneuvers to be repeated without the user re-drawing the same route. Further, the user can select multiple sequenced elements 17 in the timeline data 16 and then adjust them all at the same time via user events 109.

Figure 9:
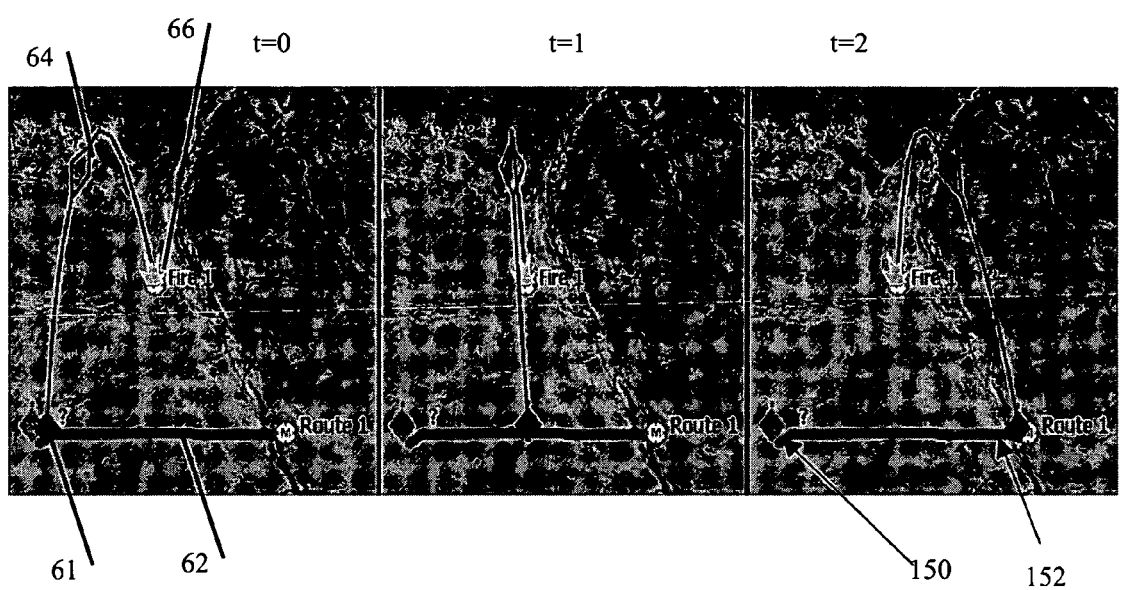
FIG. 9 shows an example fire and maneuver task animation at time t=0, t=1, t=2 of the visualization representation of FIG. 1.

During the course of the animation, displayed via synchronous updating of the graphics displayed in the timeline data 16 and the visual representation 10, each battlefield unit is represented by both its original icon 150 and a proxy icon 152 (see FIG. 9). The original icon 150 represents the battlefield unit's last reported position in the real world, and becomes translucent throughout the animation to give a point of reference for determining the battlefield unit's course relative to its planned position. The proxy icon 152 remains opaque during the animation, and shows what the battlefield unit's planned movement across the terrain 11, not its actual position. Routes are not limited to just following a course across the terrain. Air paths are also supported, allowing users to draw a space for units to follow above the terrain 11. Further, the tool 12 can perform route interpolation between maneuver tasks (e.g. can visualize the unit moving from one maneuver task to the next on the terrain 11).

Effect Synchronization

Displayed effects, such as fire tasks, are synchronized by the module 302 through the use of time-dependant animations in the 3D visualization representation 10. For example, when the user moves the time slider marker 18 back and forth across the temporal reference frame 19, the animations in the visualization representation 10 update as the marker 18 reaches their respective stages in the plan. An effect task can be visualized while the time slider marker 18 is over its respective time span (represented by the duration or extent of the rectangle of the sequenced element 17 in the timeline data 16), thus providing for the animation to play out like a movie. By viewing these animations in the visualization representation 10, users can see when it is safe for later tasks to enter the region that is under fire, for example.

Example Sequenced Elements 17

Each type of sequenced element 17 (e.g. task) can represent a different action that occurs on the battlefield terrain 11, and as such, each is visualized in the visualization representation 10 in a different manner. Referring to FIGS. 3 and 9, for example, maneuver tasks can cause the battlefield unit icon 61 to travel along a path 62, whereas fire tasks display an artillery arc 64 from the battlefield unit icon 61 to a target 66 on the terrain 11. Further, a battlefield unit may have multiple tasks associated with it. The battlefield unit can be associated with both a maneuver and fire action, resulting in the battlefield unit icon 61 moving along the path 62 while firing at the target 66. The artillery arc 64 would continually update throughout the animation to show the correct ballistics 68 information on the visualization representation 10, as well as in the data 16, 20 as desired. It is recognized that the maneuver and fire action could be represented as separate sequenced elements 17 in the timeline data 16, or as one combined summary element as desired.

Example Operation of the Tool 12

Figure 10:
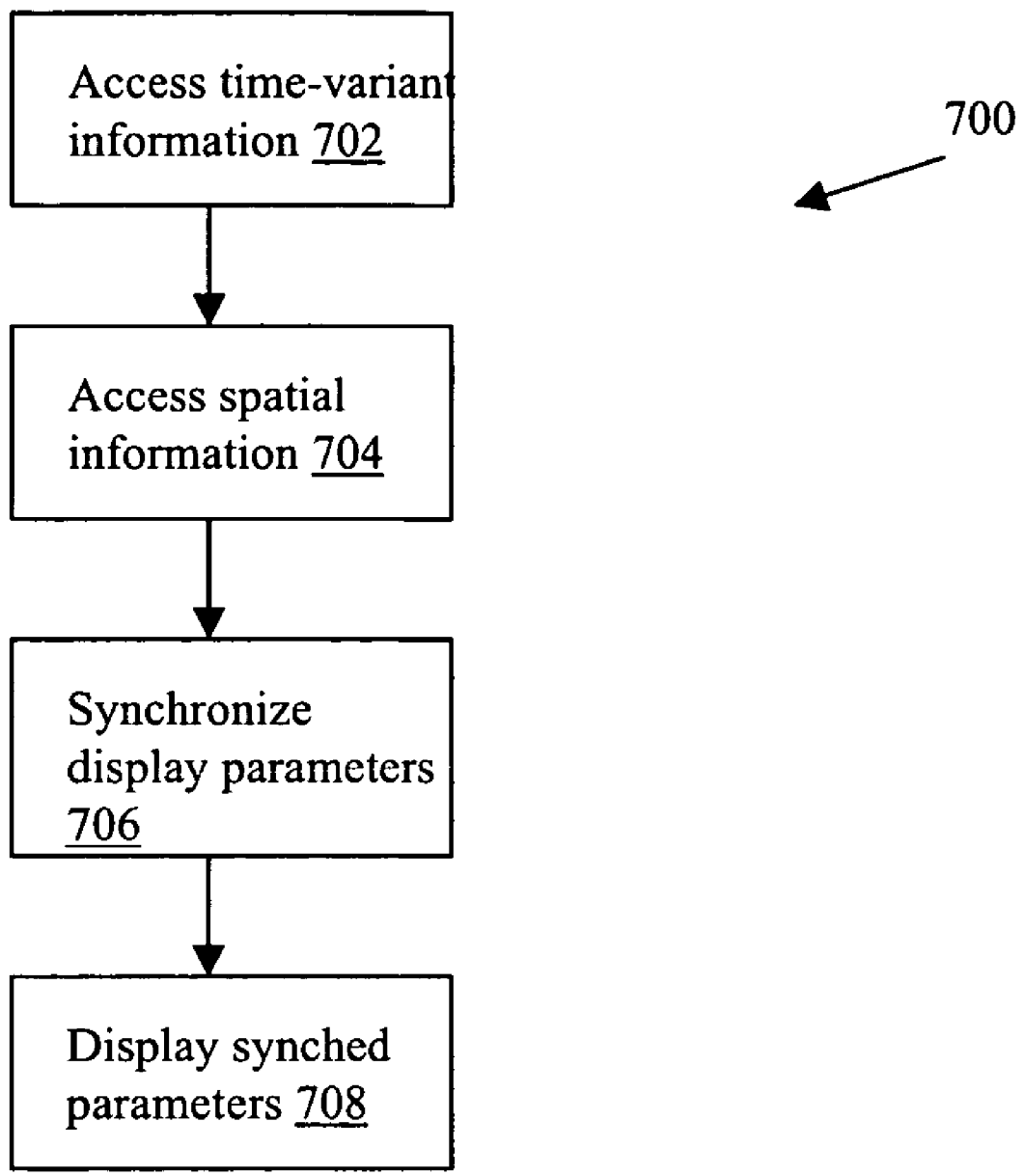
FIG. 10 is an example operation of the tool of FIG. 1.

Referring to FIGS. 1, 2, and 10, an example operation 700 of the tool 12 is shown for coordinating display of synchronized spatial information and time-variant information on the visual interface 202 as the visual representation 10 of a multi-dimensional planned process. The method has the example steps of: step 702—access the time-variant information from the data store 122 including timeline data 16 including at least two sequenced elements 17 having overlapping time spans with respect to the common temporal reference frame 19; step 704—access the spatial information from the data store 122 including a plurality of data elements 14 for representing visual elements for display in the visual representation 10 with respect to a reference surface 11, such that each of the visual elements are operatively coupled to at least one sequenced element 17 of the sequenced elements; step 706—synchronize through navigation of the marker 18 the display parameters for a displayed state on the visual interface 202 of the spatial information in the visualization representation 10 with the display parameters for a displayed state on the visual interface 202 of the time-variant information in the timeline data 16, such that it is recognized that the marker 18 facilitates navigation of the sequenced elements 17 with respect to the common temporal reference frame 19; and step 708—update display of the timeline data 16 and the visualization representation 10, including animation.

The above described system 100 can be used for visually planning managed scenarios to help in giving a precise, realistic means of the planning efforts to the user of the tool 12. While typical planning tools use a charting paradigm for scheduling events and actors, the tool 12 extends on this by presenting a live, visualization representation 10 of the plan synchronized with a display of the timeline data 16. This synchronization allows for easy interaction with objects in the plan, adding a geographic dimension to what is typically a temporal-only system. This synchronization of sequenced elements 17 through display of the timeline data 16 and visualization representation 10 can be used for military planning, where both time and space are used for successful coordination of battlefield units. Users are able to coordinate the battlefield units, and also the battlefield units' effect on targets. The system 100 provides for animated planning of coordinated battlefield units and/or tasks for actions coupled in both time and space, as displayed on visual Interface 202 (see FIG. 1). It is also recognized that the above-described system 100 can be used to generate separate data 16,20 and corresponding visualization representations 10 for different groups of activities. Further, a filter on selected set of activities by the module 302 can provide for critical activities, parent activities, or activities requiring a particular resource. Further, the system 100 can provide (using special marker fonts) a wide variety of symbols typically used in project management and decision analysis.

In view of the above, the tool 12 enables users to see plan entities in context by visualizing the plans being created and enacted in a 3D environment. Despite the added visualization dimension, planning using the tool 12 can use several affordances built into the system 100, including 1-click specification of tasks, and intuitive interaction between the data 16,20 and the visualization representation 10 (see FIG. 1). Planning in the tool 12 includes planning such as but not limited to: dynamic animated tasks on a 3D map; directly editable timings, routes, effects and targets; one click gesture specification of complex tasks, thereby coordinating the definition of task, time, terrain and/or units though simplified user event 109 gesturing; and concurrent multiple entity synchronization of routes and effects in time and space.

We claim:

1. A system for coordinating display of synchronized spatial information and time-variant information on a visual interface as a visual representation of a multi-dimensional planned process, the system comprising:
    a conversion module configured for converting sequencing charts to extract and format timeline data and chart data, the timeline data including at least two of a plurality of sequenced elements having overlapping time spans with respect to a common temporal reference frame and the chart data including interdependencies between the sequenced elements;
    a data store configured for storing the time-variant information as the timeline data and the chart data, the data store further configured for storing the spatial information as a plurality of data elements for representing visual elements for display in the visual representation with respect to a reference surface in the visual representation, each of the visual elements operatively coupled to at least one sequenced element of a plurality of sequenced elements; and
    a synchronization module coupled to the data store and configured for synchronizing a displayed state on the visual interface of the spatial information with a displayed state on the visual interface of the time-variant information, the time-variant information including the timeline data, the chart data, and including a marker for facilitating navigation of the plurality of sequenced elements with respect to the common temporal reference frame;
    wherein changes in the displayed state of the time-variant information are reflected in changes to the displayed state of the spatial information such that the navigation through the timeline data is synchronized with changes in the display of the visual elements representing the data elements and the chart data.

2. The system of claim 1, wherein chart data is synchronously displayed on the visual interface along with the time-variant information and the spatial information, the chart data representing dynamic definitions of data objects, such that each of the visual elements and their corresponding chart data is operatively coupled to said at least one sequenced element.

3. The system of claim 2 further comprising an association module configured for updating the data store of the time-variant information and the corresponding chart data and spatial information based on user selection of at least one of the displayed visual elements in the visual representation with at least one of the displayed sequenced elements of the time variant information.

4. The system of claim 1 further comprising a navigation module for manipulating the marker to effect navigation of the timeline data.

5. The system of claim 4, wherein the marker is displayed as a movable icon in the context of the common temporal reference frame.

6. The system of claim 4 further comprising the navigation module configured for facilitating adjustment of the display of the timeline data to account for a variable time scale.

7. The system of claim 6, wherein the time scale is chosen based on at least one element selected from the group comprising: the sequenced elements; and the data elements.

8. The system of claim 4 further comprising an association module configured for updating the data store of the time-variant information and the spatial information based on a data stream when received from a data source coupled to the association module.

9. The system of claim 4 further comprising an association module configured for updating the data store of the time-variant information and the spatial information based on user manipulation of at least one of the displayed visual and sequenced elements.

10. The system of claim 9, wherein the association module is configured for associating the selected at least one of the displayed visual elements with the at least one of the displayed sequenced elements using a drag and drop user interface operation.

11. The system of claim 10, wherein the simultaneous update includes association of a selected one of the data elements with each of the sequenced elements of the selected group of the sequenced elements.

12. The system of claim 4, wherein the data elements of the plurality of data elements are selected from the group comprising: battlefield units; terrain; routes on the terrain; routes above the terrain; and terrain markings, and the chart data contains detailed parameter definitions of the data elements and their interdependencies.

13. The system of claim 4, wherein the multi-dimensional planned process is selected from the group comprising: a manufacturing process; a theatrical production; a battlefield simulation; an engineering project; and a real-time battlefield scene.

14. The system of claim 4, wherein the sequencing charts are a Gantt chart data source.

15. The system of claim 4, wherein the sequenced elements of the plurality of sequenced elements are selected from the group comprising: actions; resources; tasks; process step; and events.

16. The system of claim 4, wherein at least one of the visual elements is a route shown on or above the geographic terrain and the route is associated with at least one of the plurality of sequenced elements.

17. A method for coordinating display of synchronized spatial information and time-variant information on a visual interface as a visual representation of a multi-dimensional planned process, the method comprising the steps of:
    converting sequencing charts to extract and format timeline data and chart data, the timeline data including at least two of a plurality of sequenced elements having overlapping time spans with respect to a common temporal reference frame and the chart data including interdependencies between the sequenced elements;
    accessing the time-variant information from a data store including timeline data and the chart data a marker for facilitating navigation of the plurality of sequenced elements with respect to the common temporal reference frame;
    accessing the spatial information from a data store including a plurality of data elements for representing visual elements for display in the visual representation with respect to a reference surface, each of the visual elements operatively coupled to at least one sequenced element of a plurality of sequenced elements; and synchronizing through use of the marker a displayed state on the visual interface of the spatial information with a displayed state on the visual interface of the time-variant information including the timeline data and the chart data;

wherein changes in the displayed state of the time-variant information are reflected in changes to the displayed state of the spatial information such that the navigation through the timeline data is synchronized with changes in the display of the visual elements representing the data elements and the chart data.

18. The method of claim 17 further comprising the step of synchronously displaying chart data on the visual interface along with the time-variant information and the spatial information, the chart data representing dynamic definitions of data objects, such that each of the visual elements and their corresponding chart data is operatively coupled to said at least one sequenced element.

19. The method of claim 18 further comprising the step of updating the data store of the time-variant information and the corresponding chart data and spatial information based on user selection of at least one of the displayed visual elements in the visual representation with at least one of the displayed sequenced elements of the time variant information.

20. The method of claim 17 further comprising a navigation module for manipulating the marker to effect navigation of the timeline data.

21. The method of claim 20, wherein the marker is displayed as a movable icon in the context of the common temporal reference frame.

22. The method of claim 20 further comprising the step of adjusting of the display of the timeline data to account for a variable time scale.

23. The method of claim 22, wherein the time scale is chosen based on at least one element selected from the group comprising: the sequenced elements; and the data elements.

24. The method of claim 20 further comprising the step of updating the data store of the time-variant information and the spatial information based on a data stream when received from a data source coupled to the association module.

25. The method of claim 20 further comprising the step of updating the data store of the time-variant information and the spatial information based on user manipulation of at least one of the displayed visual and sequenced elements.

26. The method of claim 25, wherein the updating step simultaneously updates a selected group of the sequenced elements.

27. The system of claim 26, wherein the simultaneous update includes association of a selected one of the data elements with each of the sequenced elements of the selected group of the sequenced elements.

28. The method of claim 20, wherein the data elements of the plurality of data elements are selected from the group comprising: battlefield units; terrain; routes; and terrain markings.

29. The method of claim 20, wherein the multi-dimensional planned process is selected from the group comprising: a manufacturing process; a theatrical production; a battlefield simulation; an engineering project; and a real-time battlefield scene.

30. The method of claim 20, wherein the sequencing charts are a Gantt chart data source.

31. The method of claim 20, wherein the sequenced elements of the plurality of sequenced elements are selected from the group comprising: actions; resources; tasks; process step; and events.

* * * * *